March 6, 1956 S B. TAYLOR 2,737,365
GATE VALVE
Filed Oct. 6, 1950

INVENTOR.
S. BLACKWELL TAYLOR
BY John N. Wolfram
Agent

United States Patent Office 2,737,365
Patented Mar. 6, 1956

2,737,365

GATE VALVE

S Blackwell Taylor, Cleveland, Ohio, assignor to The Parker Appliance Company, Cleveland, Ohio, a corporation of Ohio Application October 6, 1950, Serial No. 188,754

1 Claim. (Cl. 251—329)

This invention relates to valves and is particularly directed to gate valves of the flat plate type. In valves of this kind it has heretofore been the universal practice to form the valve body in two sections and to attach the sections together by screws or bolts and to seal the joint therebetween with a gasket. This has a number of disadvantages which the applicant has overcome by integrally uniting the body sections.

In flat plate type gate valves the valve plate is mounted in a valve chamber formed within the body sections and is movable between port opening and port closing positions. The valve chamber has flat surfaces for supporting the valve plate and the sides of the chamber guide the plate in its movement between port opening and port closing positions. The plate is actuated by a stem which extends through the valve body. In the closed position the plate overlies the port through the valve and leakage past the plate is prevented by having the plate bear upon a sealing element surrounding the valve port.

It is essential that the gate be closely guided in its movement and that it be confined closely between the flat supporting surfaces. To so guide, confine and support the valve plate, surfaces on both body sections are utilized.

When the body sections are secured together by bolts or screws and with a gasket between them to seal the joint, the position of the body sections relative to each other may vary because of non-uniform compression of the gasket and also because of distortion of the body sections due to the stresses imposed by the bolts or screws. Such variation may result in binding of the valve plate so as to interfere with its free operation. This is especially true when replacing gaskets or making other repairs after the valve is in service.

Another disadvantage in bolting the body parts together is that extra material must be provided in which to form the bolt holes. Since flat plate type gate valves in which the valve plate is fully enclosed involve elongated bodies of considerable perimeter, a relatively large number of bolts is required and thus the size and weight of the valve is materially increased.

It is an object of the present invention to eliminate the above mentioned disadvantages by providing a body for gate valves of the type described in which the body is an integral unit so that all surfaces therein are permanently maintained in fixed relation to each other and thus eliminate binding or other faulty operation.

It is another object to provide a flat plate type gate valve wherein the valve body is formed of two sections integrally united by welding or brazing and wherein the sections are free from stresses tending to distort the surfaces within the body which support and confine the valve plate.

It is another object to provide a flat plate type gate valve wherein the valve body is formed of two sections integrally united so as to permanently confine the valve plate therebetween.

It is another object to provide a flat plate type gate valve in which the valve plate is permanently and completely confined within the valve body and in which the body is formed of two sections integrally united, the meeting edges of the sections being of a width substantially the same as the wall thickness of the sections.

It is another object to provide a body for a flat plate type gate valve which is of minimum size and weight for any given flow capacity through the valve.

Other objects will become apparent from a detailed description and from the drawings in which:

Figure 1 is a plan view of the valve.

Figure 2 is a longitudinal view partly in section along the lines 2—2 of Fig. 1.

Figure 3 is a cross section view along the lines 3—3 of Figure 1.

Figure 4 is a fragmentary section showing an optional method of welding the body sections together.

The valve has two body sections, 10 and 11, which are substantially flat and rectangular in form. The body section 10 has a port 12 therethrough which is surrounded at its outer end by a sealing surface 13. A series of lugs 14 are spaced about this sealing surface and are threaded as at 15 to provide a means for clamping a pipe line fitting (not shown) into sealing engagement with the surface 13.

At one of its ends the body section 10 has a shallow recess 16 about the port 12 and a somewhat deeper recess 17 at its other end. The recess 17 has a step or shoulder 18 about its outer edges which is in the same plane as the bottom surface 19 of the shallow recess 16 and forms therewith a track for the flat valve plate 20. A wall portion 21 completely surrounds the track and is of a thickness that is substantially uniform and substantially the same as the thickness of the wall portion 22 at the bottom of the recess 17. The elongated side walls 53 of the valve track are parallel and closely fit the sides of the valve plate 20 to guide the same in its movement between open and closed positions. The valve plate is of rectangular shape and its relation with the body is more fully described and claimed in the copending application of Nicholas Bashark, Serial Number 123,770, filed October 26, 1949, patented February 1, 1955, No. 2,701,117.

The body section 11 has a bore 25 formed at one end thereof and in which is mounted a sealing element generally designated 26. This sealing element is shown and claimed in the copending application 15,645 of Wilton Margrave filed March 18, 1948.

The sealing element comprises a ring 27 having a rubber-like gasket 28 at its inner end and having a flexible diaphragm 29 attached thereto by means of a wedge ring 30. The outer margin of the diaphragm is sealingly clamped against the bottom of a counterbore 31 in the body by a clamping ring 32. A snap ring 33 is mounted in slots 34 in upstanding lugs 35 formed on the body section 11 and engages the clamping ring 32 for holding the latter in place. A spring 34[a] engages the wedge ring 30 for constantly urging the sealing element inwardly. When the valve plate 20 overlies the port 12 to close the valve, inward movement of the sealing element is limited by contact with the plate. When the plate is withdrawn to open the valve, inward movement of the sealing element is limited by the contact of the shoulders 35 and 36 formed on the ring 27 and the body section 11, respectively.

The bore 37 through the wedge ring 30 defines a port through the body section 11. This body section has a flat surface 38 surrounding the sealing element 26, and overlying the recess 16 and also has a recess 39 overlying the recess 17 in the body section 10. The recess 39 is surrounded by a flat surface 40 which is co-planar and continuous with the surface 38. The width of the surface 40 and the thickness of the wall portion 41 is substantially the same as the width of the wall portion 21 of the body section 10.

Lugs 35a are spaced about the counterbore 31 and are threaded as at 45 to provide a means of attaching a pipe line fitting (not shown) into sealing engagement with the outer face 36a of the clamping ring 32. Several lugs 46 are formed on the body section 11 and a mounting plate 47 is attached thereto by means of screws 48. The mounting plate has a plurality of holes 49 by means of which the valve can be securely attached to a supporting structure when installed for service.

The body section 10 is positioned against the body section 11 with the wall portion 21 in contact with the surface 40 and a portion of the surface 38 and is integrally united therewith. Uniting is preferably accomplished by the direct fusion of the surfaces 40 and 38 with the outer face of the wall portion 21, but may be alternatively accomplished by chamfering the meeting edges as at 50 and 51 in Figure 4 and by employing a brazing or welding material 52.

When the body sections 10 and 11 are integrally united as mentioned above, the recesses 16, 17 and 39 form a valve chamber for the flat valve plate 20. The plate has a slot 54 adjacent one end and in which is mounted a bearing collar 55. A crank arm 56 is contained within the recess 39 and has a pin 57 permanently attached at one end thereof. The pin extends into the bearing collar 55. The other end of the crank arm 56 is rigidly attached by brazing or the like to an extension 58 on a valve operating stem 59 which extends through a boss 60 on the body section 11. The stem 59 is rotatable by a suitable handle 61 attached thereto, or it may be rotated by an electric motor, not shown, or any other suitable means.

Figures 1 and 2 illustrate the valve in the closed position with the plate 20 between the ports 12 and 37 and sealingly engaged by the sealing element 26 for closing off all flow through the valve. The arrangement of the valve operating mechanism is such that rotation of the handle 61 in the clockwise direction as viewed in Figure 1 will cause the valve plate 20 to be withdrawn from the recess 16 into the recess 17, thus permitting flow of fluid between the ports 12 and 37. Return rotation of the handle in the counterclockwise direction causes the valve plate to again move into recess 16 for cutting off the flow between the ports.

In order to provide a valve which will satisfactorily meet the high performance requirements for aircraft installation, the valve plate 20 is closely guided in its movement between on and off positions by the side walls 53 of the valve track. Also, the portions of the surface 38 which overlie the valve plate are closely spaced with respect to the opposed surface of the valve plate 20 so as to closely confine the plate to the bottom surface 19 of the recess 16. By integrally uniting the body sections as mentioned above these guiding and confining surfaces for the valve plate are permanently fixed with respect to each other and there is no chance for variation due to uneven gasket compression or to distortion of the body sections such as is very likely to occur when the body sections are bolted or screwed together. Furthermore, the valve plate 20 together with the crank arm 56, both of which are inserted in the valve chamber before welding of the parts, are permanently retained and there is no chance for mix-up during repair servicing with other parts from other valves which might result in binding or other improper operations.

I claim:

In a valve, elongated casing sections each having a port therethrough at one end of the sections, said sections having opposed surfaces abutting each other along a continuous line about the periphery of the sections, the inner side edges of said opposed sections being parallel, one of said sections being recessed along said parallel side edges to form a valve track, a flat valve plate of uniform thickness having parallel side edge portions supported by the track, the other of said sections having surfaces closely overlying the track for snugly retaining the plate valve therebetween, a sealing element mounted in the port of one of the casing sections and adapted to sealingly engage one side of the valve plate when the latter is in port closing position, a stem projecting through one of the casing sections at the other end thereof and connected with the valve plate for moving the same from one end to the other of the casing sections and into and out of engagement with the sealing element, said valve track being exposed to fluid in the valve ports when the valve plate is moved out of engagement with the sealing element, the abutting portions of the casing sections being welded together for permanently sealing the same and for permanently retaining the sections in fixed relation.

References Cited in the file of this patent
UNITED STATES PATENTS

| 703,583 | Hirt | July 1, 1902 |
| 1,404,028 | Jones | Jan. 17, 1922 |
| 1,548,634 | Schiller | Aug. 4, 1925 |
| 2,054,445 | Plant | Sept. 15, 1936 |

FOREIGN PATENTS

| 108,815 | Austria | 1928 |
| 699,101 | France | 1931 |